United States Patent
Mohanty et al.

(10) Patent No.: US 8,887,271 B2
(45) Date of Patent: Nov. 11, 2014

(54) METHOD AND SYSTEM FOR MANAGING OBJECT LEVEL SECURITY USING AN OBJECT DEFINITION HIERARCHY

(75) Inventors: Bhanu P. Mohanty, Santa Clara, CA (US); Sanjeev K. Agarwal, Santa Clara, CA (US)

(73) Assignee: SAP SE, Walldorf, DE (US)

( * ) Notice: Subject to any disclaimer, the term of this patent is extended or adjusted under 35 U.S.C. 154(b) by 1131 days.

(21) Appl. No.: 12/484,814

(22) Filed: Jun. 15, 2009

(65) Prior Publication Data

US 2010/0319067 A1 Dec. 16, 2010

(51) Int. Cl.
*G06F 21/22* (2006.01)
*H04L 29/06* (2006.01)
*G06F 21/62* (2013.01)

(52) U.S. Cl.
CPC ...... *H04L 63/101* (2013.01); *G06F 2221/2141* (2013.01); *G06F 2221/2145* (2013.01); *G06F 21/6218* (2013.01)
USPC .............. 726/21; 726/16; 726/17; 726/27; 726/30

(58) Field of Classification Search
CPC ....... H04L 63/20; H04L 63/101; G06F 21/10; G06F 21/6218; G06F 2221/2141; G06F 2221/2145; G06F 21/604; G06F 21/6227
USPC ..................... 726/6, 16–21, 27–30
See application file for complete search history.

(56) References Cited

U.S. PATENT DOCUMENTS

| | | | |
|---|---|---|---|
| 5,878,415 A * | 3/1999 | Olds ........................... 1/1 |
| 6,047,377 A * | 4/2000 | Gong .......................... 726/21 |
| 6,192,476 B1 * | 2/2001 | Gong ........................... 726/4 |
| 6,202,066 B1 * | 3/2001 | Barkley et al. ............... 707/785 |
| 6,412,070 B1 * | 6/2002 | Van Dyke et al. ............ 726/17 |
| 6,944,777 B1 * | 9/2005 | Belani et al. ................. 713/150 |
| 7,127,461 B1 * | 10/2006 | Zhu et al. ..................... 707/694 |
| 7,475,431 B2 * | 1/2009 | Chao ............................ 726/30 |
| 7,613,711 B2 * | 11/2009 | Dutta et al. ................... 1/1 |
| 7,644,086 B2 * | 1/2010 | Boozer et al. ................. 726/21 |
| 7,653,648 B2 * | 1/2010 | Pacholec et al. ....... 707/999.102 |
| 7,673,323 B1 * | 3/2010 | Moriconi ..................... 726/1 |
| 7,870,387 B1 * | 1/2011 | Bhargava et al. ............. 713/166 |
| 8,024,566 B2 * | 9/2011 | Stanev ......................... 713/167 |
| 8,296,840 B2 * | 10/2012 | Burger et al. ................. 726/16 |
| 8,365,254 B2 * | 1/2013 | Burke et al. .................. 726/4 |
| 2002/0026592 A1 * | 2/2002 | Gavrila et al. ................ 713/201 |
| 2003/0084325 A1 * | 5/2003 | Koved et al. ................. 713/200 |
| 2003/0188198 A1 * | 10/2003 | Holdsworth et al. ......... 713/201 |
| 2004/0088543 A1 * | 5/2004 | Garg et al. ................... 713/157 |
| 2004/0205355 A1 * | 10/2004 | Boozer et al. ................ 713/200 |
| 2004/0254884 A1 * | 12/2004 | Haber et al. .................. 705/51 |
| 2004/0260948 A1 * | 12/2004 | Miyata et al. ................ 713/201 |
| 2005/0234803 A1 * | 10/2005 | Zhang et al. ................. 705/37 |
| 2006/0075503 A1 * | 4/2006 | Bunker et al. ................ 726/25 |
| 2007/0006203 A1 * | 1/2007 | Marwinski .................... 717/166 |
| 2008/0034438 A1 * | 2/2008 | Mireku ......................... 726/27 |
| 2008/0216169 A1 * | 9/2008 | Naizhen et al. ............... 726/16 |
| 2008/0235231 A1 * | 9/2008 | Gass et al. .................... 707/9 |

(Continued)

*Primary Examiner* — Catherine Thiaw
(74) *Attorney, Agent, or Firm* — Fountainhead Law Group PC (57) ABSTRACT

In one embodiment the present invention includes a computer-implemented method comprising receiving a request from a user to perform an action on a first object in a software application, accessing a predefined hierarchy of a plurality of different object definitions, accessing user authorization data, and granting the user permission to perform the action on said first object, wherein the permission is determined from the predefined hierarchy and the user authorization data, wherein determining the permission includes traversing the predefined hierarchy.

18 Claims, 7 Drawing Sheets

(56) References Cited

U.S. PATENT DOCUMENTS

| | | | |
|---|---|---|---|
| 2008/0295181 A1* | 11/2008 | Dotan | 726/27 |
| 2009/0007262 A1* | 1/2009 | Wallace et al. | 726/21 |
| 2009/0132285 A1* | 5/2009 | Jakobovits | 705/3 |
| 2010/0050190 A1* | 2/2010 | Hiltgen et al. | 719/328 |
| 2010/0082552 A1* | 4/2010 | Beatty et al. | 707/674 |
| 2010/0162389 A1* | 6/2010 | Burger et al. | 726/21 |
| 2010/0257206 A1* | 10/2010 | Brown et al. | 707/784 |
| 2010/0325159 A1* | 12/2010 | Wright et al. | 707/783 |

\* cited by examiner

| Traversal Height | Catalog Depth |
|---|---|
| 2 | 2 |

| Child | Parent | Weight |
|---|---|---|
| Risk | Market Segment | 1 |
| Risk | Rule Set | 2 |
| Risk | Process | 3 |
| Function | Process | 1 |
| Process | Org Unit | 1 |
| System | Org Unit | 1 |

*FIG. 5A*

| Access Control List ||| 
|---|---|---|
| User | Permission | Object |
| User 1 | Risk.Delete | Risk.F005 |
| User 1 | Risk.Delete | MarketSegment.EU |
| User 1 | Risk.Delete | OrgUnit.GRC |
| User 1 | OrgUnit.Edit | OrgUnit.GRC |
| User 1 | Risk.Delete | RuleSet.Y |
| User 1 | Risk.Delete | RuleSet.X |
| User 2 | Risk.Delete | Risk.F001 |
| User 2 | Process.modify | Process.Finance |

*FIG. 5B*

Risk F005
    └─ OrgUnit -> GRC
    └─ Rule Set -> X
    └─ Market Segment -> US

METHOD AND SYSTEM FOR MANAGING OBJECT LEVEL SECURITY USING AN OBJECT DEFINITION HIERARCHY

BACKGROUND

The present invention relates to computer software, and in particular, to a method and system for managing object level security to using an object definition hierarchy.

Computer security may be implemented in various ways. For example, in a hierarchical folder system, such as Microsoft Windows, permissions may be specified for a folder and such permissions control access for all subfolders. In other applications, user permissions are assigned based on roles or actions. For example, a user may be an account receivable employee, and the computer software application may have multiple permissions for performing various tasks that are predefined and associated with the "account receivable employee" role. Another user, such as a manager, may have different permissions based on a different role, for example. In an action based permission system, each user may be granted permission to perform specific actions (e.g., on specific entities in the system) within a software system. In some prior art security systems, permissible actions may be grouped in a user role, which may then be assigned to a particular user. Thus, for each action that a user may want to perform, a permission to perform the action may need to be assigned to the user in order to allow the user to perform the action.

One example software system where security is an issue is a risk analysis software application. Typically, a risk analysis software application may have a large number of objects associated with it. Moreover, there may be many users of the risk analysis software application interacting with the objects. Therefore, it may be desirable to control who or what may access a particular object in the risk analysis software application. However, when a risk analysis software application has a large number of objects and also a large number of users, it may cumbersome to manage because a permission to perform a particular action may need to be assigned for each user that may need to perform the action on the particular object.

Thus, there is a need for improved techniques for managing object level security. The present invention solves these and other problems by providing a method and system for managing object level security using an object definition hierarchy.

SUMMARY

In one embodiment, the present invention includes a computer-implemented method comprising receiving a request from a user to perform an action on a first object in a plurality of objects in a software application, accessing a predefined hierarchy of a plurality of different object definitions, wherein said first object is an instance of a first object definition in the predefined hierarchy, accessing user authorization data, determining permission of the user to perform said action, and granting the user permission to perform the action on said first object. The permission is determined from the predefined hierarchy and the user authorization data, and the user is granted permission to perform the action on said first object if the user authorization data grants the user permission to perform the action on the first object based on the first object definition and an associated second object, wherein the second object is an instance of a second object definition, and wherein said second object definition is an ancestor of said first object definition in the predefined hierarchy.

In one embodiment, said first object is associated with said second object.

In one embodiment, said first object includes information specifying said second object.

In one embodiment, determining the permission from the predefined hierarchy and the user authorization data includes determining the ancestor object definitions of said first object definition at a particular level in the predefined hierarchy, for each ancestor object definition, checking the permission to perform the action based on an instance of the ancestor object definition, wherein the order of checking the ancestor object definitions is based on a predetermined order, and traversing to the next level if the user has not been granted permission to perform the action on said first object, and not traversing to the next level if the user has been granted permission to perform the action on said first object.

In one embodiment, the maximum number of levels that can be traversed is based on a predetermined value.

In one embodiment, the predefined hierarchy of the plurality of object definitions is stored in a database.

In one embodiment, the user authorization data comprises a list of permissions, and wherein an entry in the list of permissions specifies at least one user, a permissible action that may be performed on a specified object definition, and an object instance of an ancestor object definition.

In one embodiment, an object in the software application includes information specifying one or more different objects in the software application, wherein each of the one or more different objects in the software application is an instance of an ancestor object definition in the predefined hierarchy.

In one embodiment, the plurality of object definitions in the predefined object definition hierarchy is configured as a directed graph.

In one embodiment, the directed graph is configured in a multi-parent unbalanced non-binary tree form.

Embodiments of the present invention may be realized in a computer-readable medium, such as a hard disk drive, optical or magnetic medium, containing instructions for controlling a computer system to perform the methods described herein.

The following detailed description and accompanying drawings provide a better understanding of the nature and advantages of the present invention.

DETAILED DESCRIPTION

Described herein are techniques for a method and system for managing object level security to using an object definition hierarchy. The apparatuses, processes, and techniques described below may be implemented as a computer program (software) executing on one or more computers. The computer program may further be stored on a computer readable medium. The computer readable medium may include instructions for performing the processes described below. In the following description, for purposes of explanation, numerous examples and specific details are set forth in order to provide a thorough understanding of the present invention. It will be evident, however, to one skilled in the art that the present invention as defined by the claims may include some or all of the features in these examples alone or in combination with other features described below, and may further include modifications and equivalents of the features and concepts described herein.

Figure 1A:
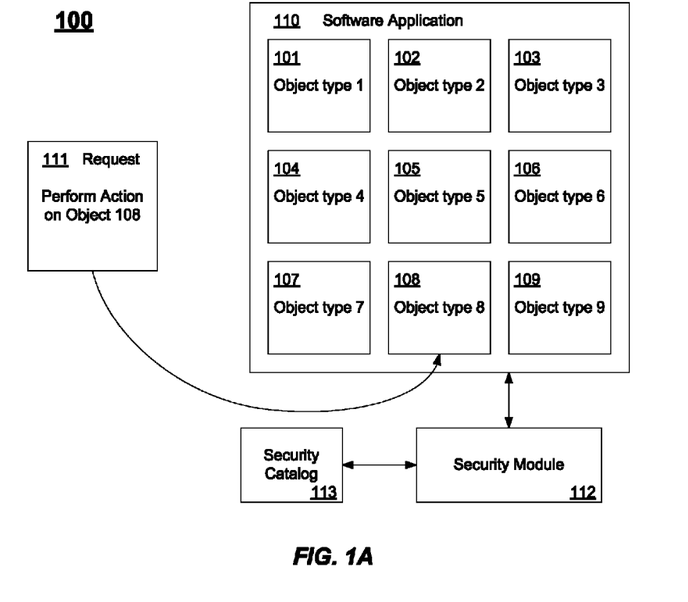
FIG. 1 illustrates an object level security system according to one embodiment of the present invention.

FIG. 1 illustrates an object level security system according to one embodiment of the present invention. Object level security system 100 may include software application 110, request 111, and security module 112. Software application 110 may include a plurality of objects. An object may be an instance of an object definition. For purposes of illustration, the objects shown in FIG. 1 (i.e., objects 101-109) may each be of a different type. That is, each object may be an instance of a different object definition. However, software application 110 may include multiple objects of the same type, multiple objects of different types, or combinations thereof. Further, software application 110 may receive requests to perform an action on objects included in software application 110. Additionally, software application 110 may receive requests to create objects that may be included in software application 110. Based on a particular request, software application 110 may be configured to process the request (i.e., what action to perform and on which object, if any, to perform the action).

In some embodiments, request 111 may be a request to perform an action on an object (e.g., object 108) in software application 110. As previously stated, request 111 may be communicated to software application 110 where software application 110 may include logic (i.e., instructions) for processing request 111. Actions that may be performed may include, but are not limited to, modify an object, delete an object, or create an object, for example. A request to perform an action on an object may come from various sources. For example, request 111 may come from a user of system 100 (e.g., user attempts to modify an object in software application 110), a different computer system, a different software application, or the like.

In certain embodiments, security module 112 may be a source of authorization data that determines whether the requester making a request to perform an action on an object has permission to perform the action on the object. In other words, security module 112 may store information that may indicate who or what may access a particular object and what actions may be performed on the particular object. In addition, security module 112 may be a source of information about a predefined hierarchy of a plurality of different object definitions (e.g., FIG. 2), which may be used as part of determining whether a requester making a request to perform an action on an object has permission to perform the action on the object. Software application 110 may have access to the authorization data of security module 112 as well as the information about the predefined hierarchy of security module 112. Using this information (i.e., the authorization data and the information about the predefined hierarchy), software application 110 may determine whether to allow a request to perform an action on an object.

Figure 2:
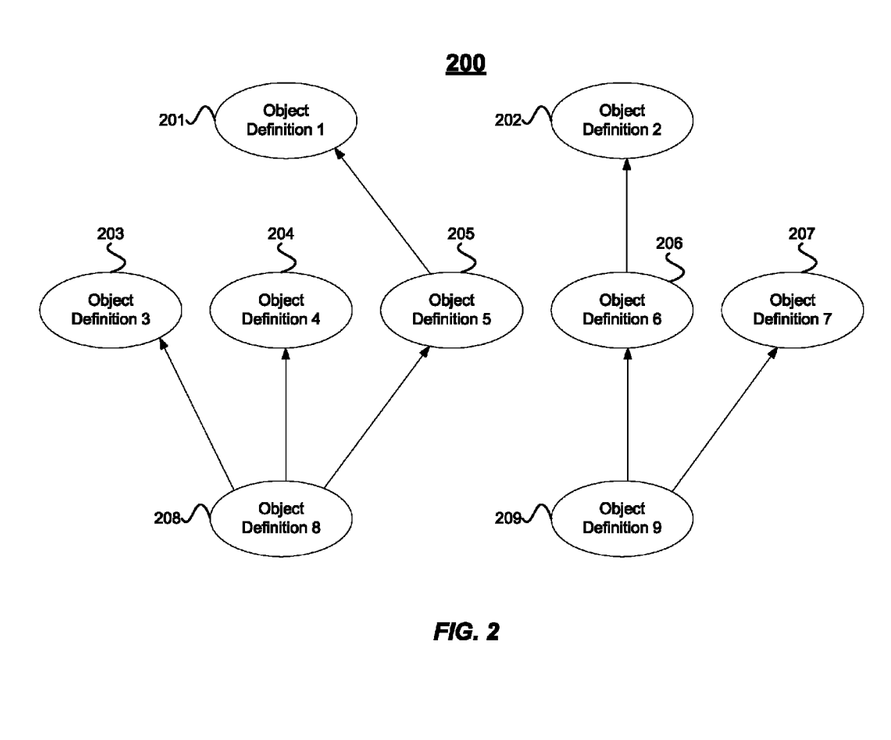
FIG. 2 illustrates an example hierarchy of object definitions according to one embodiment of the present invention.

FIG. 2 illustrates an example hierarchy of object definitions according to one embodiment of the present invention. Hierarchy 200 represents the relationships between object definitions as a directed graph, which may be predefined based on object definition inheritance. Example hierarchy 200 includes two tree structures each having a single root. However, other hierarchies may have multiple different roots as illustrated by the example in FIG. 4 below. In one embodiment, a software developer or system administrator of software application 110 may be aware of all the object definitions associated with software application 110 and how they relate to each other. Thus, the software developer or system administrator may know how to configure hierarchy 200 to allow software application 110 to function as desired herein. Note that hierarchy 200 may be configured in numerous ways, and the configuration depicted in FIG. 2 may be one of many of such ways. As mentioned above, an object may be an instance of an object definition. Therefore, each object in software application 110 may be an instance of a corresponding object definition in hierarchy 200. In this example, object 101 may be an instance of object definition 201, object 102 may be an instance of object definition 202, object 103 may be an instance of object definition 203, object 104 may be an instance of object definition 204, object 105 may be an instance of object definition 205, object 106 may be an instance of object definition 206, object 107 may be an instance of object definition 207, object 108 may be an instance of object definition 208, and object 109 may be an instance of object definition 209.

In some embodiments, hierarchy 200 may include a plurality of different object definitions. Accordingly, object definition 201 (i.e., object definition 1), object definition 202 (i.e., object definition 2), object definition 203 (i.e., object definition 3), object definition 204 (i.e., object definition 4), object definition 205 (i.e., object definition 5), object definition 206 (i.e., object definition 6), object definition 207 (i.e., object definition 7), object definition 208 (i.e., object definition 8), and object definition 209 (i.e., object definition 9) may each be a different object definition. Furthermore, according to hierarchy 200, object definitions 203, 204, and 205 may each be a parent (i.e., an ancestor) of object definition 208. Object definition 201 may be a parent (i.e., an ancestor) of object definition 205. Since object definition 201 may be a parent of object definition 205, and object definition 205 may be a parent of object definition 208, object definition 201 may be an ancestor of object definition 208. Similarly, object definitions 206 and 207 may each be a parent (i.e., an ancestor) of object definition 209, and object definition 202 may be a parent (i.e., an ancestor) of object definition 206. Thus, object definition 202 may be an ancestor of object definition 209 because object definition 202 may be a parent of object definition 206 and object definition 206 may be a parent of object definition 209.

Figure 1B:
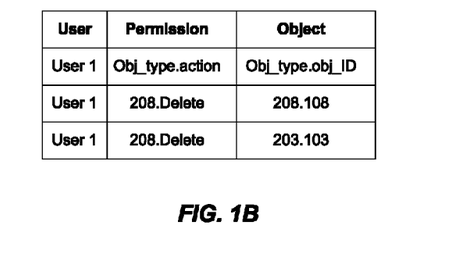

The following describes how object level security system 100 of FIG. 1 and hierarchy 200 of FIG. 2 may function together. In this example, security module 112 may be a source of information about hierarchy 200. That is, security module 112 may store information specifying the arrangement of the object definitions in the hierarchy. Additionally, security module 112 may access a security catalog 113 for determining permissions. An example security catalog 113 may include an Access Control List (ACL) as illustrated in FIG. 1B, where the ACL specifies a user, a particular permission relating to a particular object definition, and the types of object instances the permission applies to (e.g., where object definitions support instances of different object types), for example. The ACL may be in the form of a table, for example, where each row of the table includes a user field, a permission field, and an object field. The user field specifies the particular user the permission and object fields are associated with. The object field specifies particular objects the user is granted access to (e.g., object type and object ID). The permission field specifies the actions the user may perform on types of objects (e.g., object type and permissible action). Specifically, in a first record in the example security catalog of FIG. 1B, User 1 has an associated object field specifying object type 208 and object 108. Further, User 1 has an associated permission field specifying object type 208 and delete. Additionally, in a second record in the example security catalog of FIG. 1B, User 1 has an associated object field specifying object type 203, which is a parent of object type 208, and object 103. Further, User 1 has an associated permission field specifying object type 208 and delete. The permissions and objects specified in the security catalog may be used to control allowable actions in the system as described below. Software application 110 may receive a request to perform an action on an object. In this example, software application 110 may receive request 111 to perform an action (e.g., modify) on object 108 (i.e., object type 8). In response, software application 110 may access security module 112 and security catalog 113 to determine whether the requester making request 111 may have permission to perform the action (e.g., modify) on object 108. Software application 110 may access the authorization data and the information about the predefined hierarchy 200 in security module 112 to check whether the requester making request 111 may have permission to perform the action (e.g., modify) on object 108.

Based on hierarchy 200, software application 110 may determine that object 108 may be an instance of object definition 208 of hierarchy 200. Accordingly, software application 110 may access the authorization information, including the security catalog for example, to determine if the user has permission to perform that desired action on object 108. For example, the authorization data may specify that User 1 has permission to modify instances of object definition 208, which would allow User 1 to modify, but maybe not delete, object 108. For example, the security catalog may specify that User 1 has permission 208.mod and an object field 208.108, which grants direct permission to modify object 108. However, if the authorization data does not grant a user direct permission to perform an action on a particular object, features and advantages of the present invention allow such authorization to be granted through inheritance, where object fields in the security catalog pertaining to ancestor object definitions and objects may be used to grant permission to perform actions on objects that are instances of child definitions. For instance, software application 110 may determine which of the object definitions in hierarchy 200 may be a parent object definition of object definition 208 (i.e., an ancestor object definition one level above object definition 208). In this example, object definitions 203, 204, and 205 may each be a parent object definition of object 208. For each object definition that may be determined to be a parent object definition of object definition 208, software application 110 may determine if a user has permissions associated with the parent definitions. For example, software application 110 may access the authorization data of security module 112 to check whether the requester making request 111 may have permission to perform the action (e.g., modify) on objects that are instances of the parent object definition 203, 204, and 205. For example, software application 110 may determine that a user has permission to create objects of type 208 associated with parent object definition 203 (e.g., 203.103). Accordingly, software application 110 may grant a user permission to create object 108. As mentioned above, authorization data may include information about the hierarchy and a security catalog.

If software application 110 determines that the requester making request 111 may not have permission to perform an action (e.g., modify) on object 108 based on the parent objects as described above, software application 110 may access hierarchy 200 and traverse up another level in hierarchy 200 to determine which of the object definitions in hierarchy 200 may be a parent object definition of the previous level's parent object definitions (i.e., an ancestor object definition two levels above object definition 208). According to hierarchy 200, a parent object definition of a previous level parent object definition of object definition 208 may be object definition 201 because object definition 201 may be a parent object definition of object definition 205 and object definition 205 may be a parent object definition of object definition 208. In certain embodiments, software application 110 may keep traversing up levels in hierarchy 200 and analyzing the user's permissions for other object definitions until permission is granted, a predetermined number of levels have been traversed, or the top of hierarchy 200 has been reached. In particular, a hierarchy may have a large number of levels and a large number of object definitions at each level. Hence, to reduce the undesired long processing time it would take in the event the entire hierarchy may need to be traversed, the number of levels in the hierarchy that may be traversed may be limited to a predetermined value.

In one embodiment of the present invention, the order in which software application 110 may check the permission of a parent object is based on a predetermined order according to object definition type. For example, if the predetermined order of checking permissions for the parent object definitions is [203, 204, 205], then permissions corresponding to object definition 203 (e.g., object 103) may be checked first, permissions corresponding to object definition 204 (e.g., object 104) may be checked second, and permissions corresponding to object definition 205 (e.g., object 105) may be checked third. In following the predetermined order, if software application 110 determines that the requester making request 111 may perform the action (e.g., modify) on object 108, as described above, then software application 110 stops checking the permission for any remaining parent objects that have not been checked. Therefore, if the authorization data of security module 112 indicates that the requester making request 111 may have permission to perform the action (e.g., modify) based on object 103, and object 108 is related to object 103 (e.g., ancestor-descendent relationship), software application 110 may grant the requester making request 111 permission to perform the action (e.g., modify) on object 108. At that point, software application 110 stops checking the permissions associated with the remaining parent objects that have not been checked (i.e., object 104 and object 105).

Figure 3:
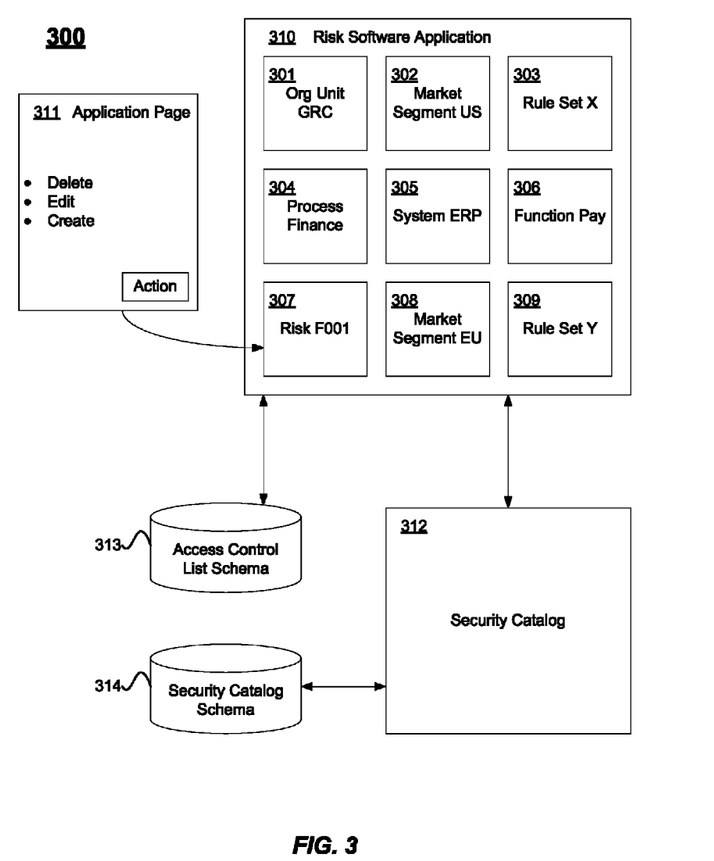
FIG. 3 illustrates an object level security system according to one embodiment of the present invention.

FIG. 3 illustrates an object level security system according to one embodiment of the present invention. Object level security system 300 may include risk analysis software application 301, application page 311, security catalog 312, access control list schema 313, and security catalog schema 314. In some embodiments, risk analysis software application 310 may be configured like software application 110 of FIG. 1, application page 311 may be configured like request 111 of FIG. 1, and security catalog 312, access control schema 313, and security catalog schema 314 may be configured to be included in security module 112 of FIG. 1.

In one embodiment of the present invention, risk analysis software application 310 may include a plurality of application objects. An application object may be an instance of an application object definition. For example, risk analysis software application 310 may include application objects 301-309. Further, each application object may be an instance of a different object definition. In FIG. 3, application object 302 and application object 308 may be instances of the same application object definition (i.e., application object definition 402 of FIG. 4), but of different object types. In this case, both object 302 and object 308 are "Market Segment" objects, but object 302 is a "Market Segment" object of type "US" and object 308 is a "Market Segment" object of type "EU". Similarly, application object 303 is a "Rule Set" object of type "X" and application object 309 is a "Rule Set" object of type "Y."

Risk analysis software application 310 may receive requests to perform an action on application objects included in risk analysis software application 310 like edit or delete, for example. As another example, risk analysis software application 310 may receive action requests to create application objects that may be included in risk analysis software application 310. According to FIG. 3, risk analysis software application 310 may receive a request from an application page (e.g., application page 311).

In some embodiments, application page 311 may be associated with risk analysis software application 310, where application page 311 allows a user to perform an action on an application object included in risk analysis software application 310. For instance, application page 311 may allow a user to delete an application object, edit an application object, or create an application object. In certain embodiments, application 311 may be a web-based graphical user interface that may allow a user to communicate with risk analysis software application 310, and, therefore, submit a request to perform an action on an application object included in risk analysis software application 310.

Figure 5A:
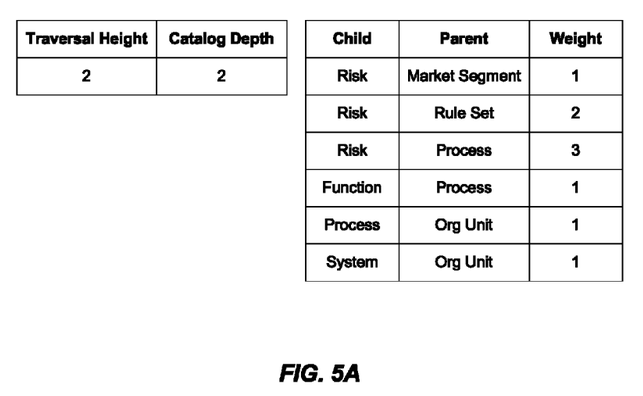
FIG. 5A illustrates an example implementation of the hierarchy in FIG. 4 according to one embodiment of the present invention.
Figure 5B:
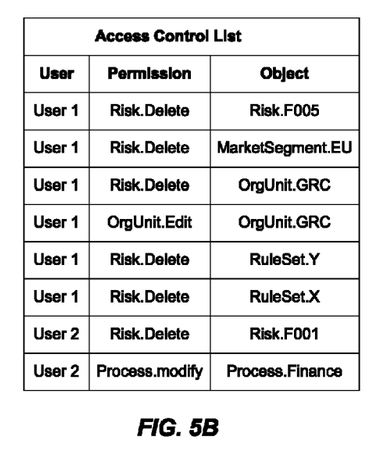
FIG. 5B illustrates an example access control list of the system in FIG. 3 according to one embodiment of the present invention.

In some embodiments of the present invention, an access control list (ACL) based security model may be used to control the security of a particular application object. An ACL may be a list of permissions, where a permission may be associated with a particular application object and further specify the action that may be performed on that application object. An ACL may specify who or what may be allowed to access the object and what operations may be allowed to be perform on the object. The format of an entry in the ACL of system 300 may be [User, Permission, Object] where the entry may specify one or more users (e.g., as individuals, groups, or by roles), permissible actions (e.g., create, delete, or modify) for a given object definition, and the objects from which authorization may be derived. For instance, the ACL may specify objects upon which actions may be performed and associated permissions or the objects that may be an ancestor of the object on which such actions may be performed and an associated permission. Therefore, if the "Permission" field specifies an allowable action on a particular object definition, then the "Object" field specifies objects that the permissions may be applied to. FIG. 5B below illustrates an example access control list of the system in FIG. 3 according to one embodiment of the present invention.

Figure 4:
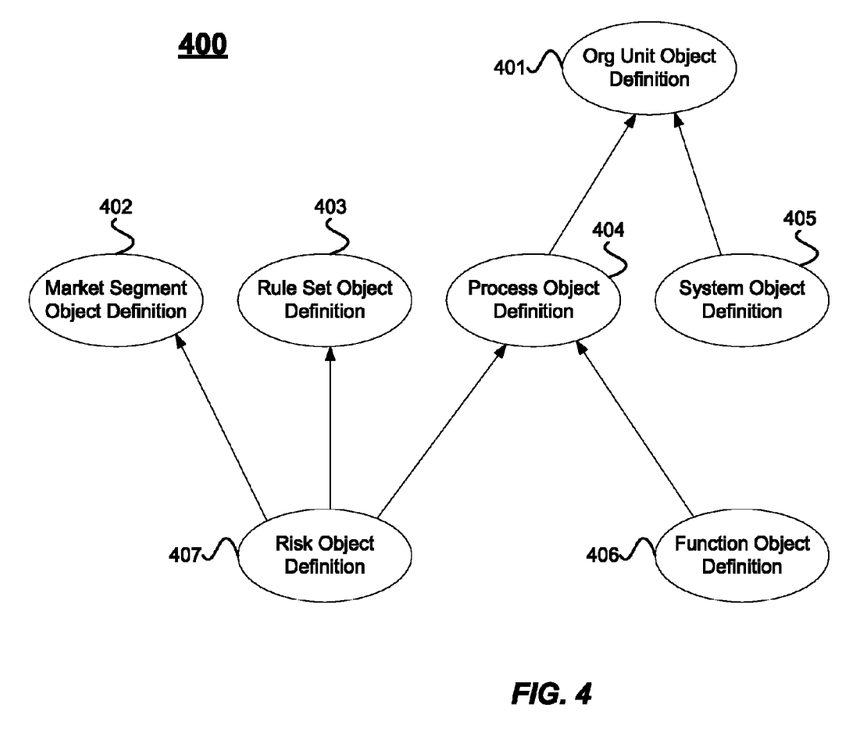
FIG. 4 illustrates an example hierarchy of object definitions according to one embodiment of the present invention.

In one embodiment, security catalog schema 314 may be stored in a repository where the data about a hierarchy may be stored. For this example, security catalog schema 314 may include data about hierarchy 400 of FIG. 4. FIG. 4 is an example hierarchy that is a directed graph configured in a multi-parent unbalanced non-binary tree. FIG. 5A illustrates an example implementation of the hierarchy in FIG. 4 according to one embodiment of the present invention. Specifically, FIG. 5A illustrates example data that may be stored in a repository according to security catalog schema 314. The data in the left table includes a predetermined value indicating the number of levels in a hierarchy (i.e., "Catalog Depth") and maximum number of levels that hierarchy 400 may be traversed (i.e., "Traversal Height"). The data in the right table includes data describing the relationships (e.g., parent-child) between the application object definitions in hierarchy 400, and includes data indicating the predetermined order in which risk analysis software application 310 may check the permission of parent objects of the same level, as previously described above.

FIG. 4 illustrates an example hierarchy of object definitions according to one embodiment of the present invention. Hierarchy 400 may include a plurality of different application object definitions. According to hierarchy 400, application object definitions 401-407 may each be a different application object definition. Moreover, hierarchy 400 may be predefined in a variety of ways. As illustrated in FIG. 4, one way that hierarchy 400 may be defined is as follows. Application object definitions 402, 403, and 404 may each be a parent (i.e., an ancestor) of application object 407. Application object definition 401 may be a parent (i.e., an ancestor) of application object definition 404. Since application object definition 401 may be a parent of application object definition 404, and application object definition 404 may be a parent of application object definition 407, application object definition 401 may be an ancestor of application object definition 407. Likewise, application object definition 404 may be a parent (i.e., an ancestor) of application object definition 406. Hence, application object definition 401 may also be an ancestor of application object definition 406. Similarly, application object definition 401 may be a parent (i.e., an ancestor) of application object definition 405.

As discussed above, an application object may be an instance of an application object definition. Therefore, each application object in risk analysis software application 310 may be an instance of a corresponding application object definition in hierarchy 400. In this example, application object 301 may be an instance of application object definition 401, application object 302 may be an instance of application object definition 402, application object 303 may be an instance of application object definition 403, application object 304 may be an instance of application object definition 404, application object 305 may be an instance of application object definition 405, application object 306 may be an instance of application object definition 406, application object 307 may be an instance of application object definition 407, application object 308 may be an instance of application object definition 402, and application object 309 may be an instance of application object definition 403.

The following describes how object level security system 300, an ACL, and hierarchy 400 of FIG. 4 may function together. Risk analysis software application 310 may receive a request from a user to perform an action on an application object. To illustrate, User 1 (which is the same User 1 in the ACL of FIG. 5B) may use application page 311 to submit a request to delete application object 307 (i.e., application object Risk F001). User 1 may submit the request by clicking on the "Action" button of application page 311. Then, risk analysis software application 310 may access the ACL of FIG. 5B, which may be stored in access control list schema 313, to determine whether User 1 may have permission to delete application object 307.

Figure 5C:
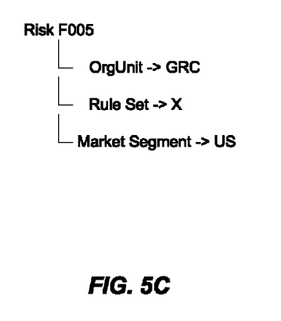
FIG. 5C illustrates an example application object of the system in FIG. 3 according to one embodiment of the present invention.

FIG. 5C illustrates an example application object of the system in FIG. 3 according to one embodiment of the present invention. Specifically, FIG. 5C depicts application object 307. As shown in FIG. 5C, application object Risk F005 includes information that may indicate an association with one or more application objects. For example, Risk F005 may be a particular risk definition for evaluating risk for the GRC organizational unit from the US Market Segment using a rule from Rule Set X. Accordingly, in this example, the application objects that application object Risk F005 may be associated with are application object OrgUnit GRC (i.e., application object 301), application object Rule Set X (i.e., application object 303), and application object Market Segment US (i.e., application object 302). A rule set may be a plurality of risk rules assigned to the rule set. For example, Rule Set X may include a plurality of risk rules in the system, which may also include Risk F005 (see FIG. 5C). Further, each application object that application object Risk F005 may be associated with may be an instance of an ancestor application object definition in predefined hierarchy 400. That is, application object OrgUnit GRC, application object Rule Set X, and application object Market Segment US may each be an instance of an ancestor application object definition in hierarchy 400. Application object Risk F005 may be defined to be associated with any number of ancestor application objects. FIG. 5C illustrates one example definition of application object Risk F005 and the ancestor application objects that may be associated with application object Risk F005.

As described above, if a user attempts to perform an action on application object 307 that is an instance of object definition 407, the ACL may be checked to determine if the user has permission rights associated with the particular object (e.g., object 307) or an ancestor. If the ACL does not include a permission for the particular object being acted on, risk analysis software application 310 may traverse hierarchy 400 to determine if permission may be granted through an ancestor object definition by accessing security catalog 312 and accessing data describing hierarchy 400, which is stored in the security catalog schema 314 (e.g., the data in the right table of FIG. 5A). Accordingly, risk analysis software application 310 may determine which of the application object definitions may be a parent application object definition of application object definition 407 (i.e., an ancestor application object definition one level above application object definition 407), which may be the application object definition that application object 307 may be an instance of. For example, the implementation of hierarchy 400 in FIG. 5A shows that Market Segment (i.e., application object definition 402) may be a parent of Risk (i.e., application object definition 407), Rule Set (i.e., application object definition 403) may be a parent of Risk, and Process (i.e., application object definition 404) may be a parent of Risk. Hence, risk analysis software application 310 may determine that application object definitions 402, 403, and 404, may each be a parent application object definition of application object definition 407. Since the predetermined order for checking permission of a particular application object may be indicated in the hierarchy information (e.g., "Weight"), permissions in the ACL pertaining to object definition type Market Segment may be checked first, object definition type Rule Set may be checked second, and object definition type Process may be checked third. Thus, risk analysis software application 310 may access the ACL in access control list schema 313 to check whether User 1 may have permission to delete application objects that are instances of the Market Segment object definition. In this example, User 1 has permission to delete risks (Risk.Delete), but only for Market Segment objects of type EU (MarketSegment.EU). Accordingly, User 1 may delete a risk application object that is an instance of the Risk object definition 407 only if such risk application object is associated with the EU market segment. However, in this case, risk object 307 is associated with the US, so no permission is granted. Because risk analysis software application 310 did not grant User 1 permission to delete application object 307, the next application object definition in the predetermined order may be checked. Accordingly, risk analysis software application 310 may check the ACL for permissions pertaining to the parent application object definition 403.

The following are example entries in the ACL of FIG. 5B: [User 1, Risk.Delete, Risk.F005], [User 1, Risk.Delete, RuleSet.X], and [User 1, Risk.Delete, OrgUnit.GRC]. Accordingly, in this example, each entry in the ACL includes at least one user, a permissible action that may be performed on a specified object definition type, and a specification of an object definition type and object instance type (or object ID). The ACL record [User 1, Risk.Delete, Risk.F005] may be used to illustrate an example of direct permission. For example, a user may issue a request to perform a Delete action on a particular object, and the system may check the object to be acted upon. An example object to be acted upon is illustrated in FIG. 5C. The example object is an instance of the Risk object definition 407. The type of Risk is F005, so the Risk object (or object ID) may be referred to as Risk.F005. The Risk object may include attributes such as an attribute to specify an organizational unit the Risk is related to (OrgUnit) and an attribute to specify the rule set to use to analyze risk (RuleSet). In this example, the OrgUnit attribute has a value of GRC and the RuleSet has a value of X. To determine if the action is permissible, the system may initially search for Risk.F005 in the objects field of records in the ACL. In this case, there is a record in the ACL where the object field has a value of Risk.F005 having an associated permission of Risk.Delete. Therefore, User 1 is granted direct permission to delete Risk.F005 objects.

ACL record [User 1, Risk.Delete, RuleSet.X] illustrates permission being set at the parent level. Using the same example object above (Risk.F005), if direct permission is not specified in the ACL, the system may next search the ACL for objects that are parents of the object being acted upon. In this case, the RuleSet object definition 403 is a parent of the Risk object definition 407. Accordingly, the system may search the ACL for records having an object field including RuleSet objects. In one embodiment, the ACL may be searched for records having object fields with particular RuleSet objects that match the RuleSet object attribute of the object being acted upon. For example, since the object being acted upon has a RuleSet attribute of X, the system may search the ACL for records having an object field specifying RuleSet.X. In this case, the ACL of FIG. 5B includes RuleSet.X in the objects field. The associated permission is Risk.Delete, which indicates that User 1 has permission to delete objects that are instances of the Risk object definition 407 based on parent object RuleSet.X. It should be noted that the system may search the ACL for records having object fields that specify Market Segment objects, since Market Segment objects are also parent objects of Risk objects. However, in this example, there will be no match in the ACL because the object being acted upon has a Market Segment attribute of US, but the only Market Segment object in the ACL, in this example, is of type EU.

ACL record [User 1, Risk.Delete, OrgUnit.GRC] illustrates permission being set at the next parent level (an ancestor level). Using the same example object above (Risk.F005), if direct permission is not specified in the ACL, and if permission were not obtained at a lower parent level, the system may next search the ACL for objects that are at the next ancestor level of the object being acted upon. In this case, the OrgUnit object definition 401 is a parent of the Process object definition 404, which in turn is a parent of the Risk object definition 407. Accordingly, the system may search the ACL for records having an object field including OrgUnit objects. In this example, the ACL may be searched for records having object fields with particular OrgUnit objects that match the OrgUnit object attribute of the object being acted upon. For instance, since the object being acted upon has a OrgUnit attribute of GRC, the system may search the ACL for records having an object field specifying OrgUnit.GRC. In this case, the ACL of FIG. 5B includes OrgUnit.GRC in the objects field. The associated permission is Risk.Delete, which indicates that User 1 has permission to delete objects that are instances of the Risk object definition 407 based on ancestor object OrgUnit.GRC. From the above description it can be seen that a permission pertaining to a descendant objects (e.g., in the permission field of the ACL) may be associated with parent objects (e.g., in the object field of the ACL) to grant permission directly or based on ancestor-descendant relationships of the object definitions.

Figure 6:
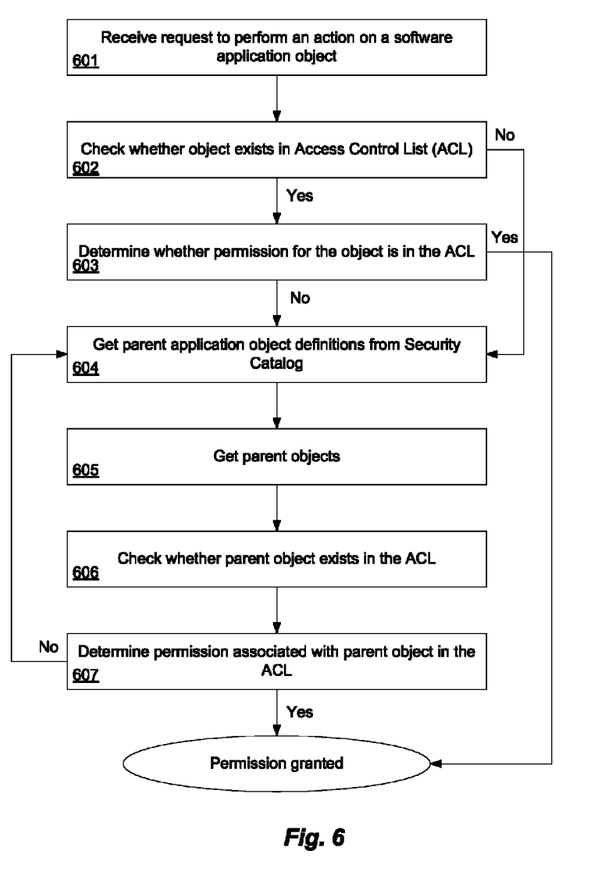
FIG. 6 illustrates a method for managing object level security using an object definition hierarchy according to one embodiment of the present invention.

FIG. 6 illustrates a method for managing object level security using an object definition hierarchy according to one embodiment of the present invention. In some embodiments, the method of FIG. 6 may be applied to the embodiments described above in FIG. 1 and FIG. 3. For purposes of illustration, the method is described in the context of the embodiment of FIG. 3. At step 601, a request (i.e., request from application page 311) may be received to perform an action (i.e., delete) on a software application object (i.e., application object 307). Then, at 602, the ACL may be checked whether application object 307 may be included in the ACL. That is, a check may be performed to determine whether the ACL includes an entry that indicates application object 307 is in the Object field. If the check indicates that such entry exists in the ACL, the method proceeds to step 603. If the check indicates that no such entry exists in the ACL, the method proceeds to step 604. At 603, it may be determined whether direct permission for the object is included in the ACL. In other words, it may be determined whether the ACL includes an entry that indicates that User 1 may have permission to delete application object 307. If the ACL includes such an entry, User 1 may be granted permission to delete application object 307, and the method ends. If not, the method goes to step 604. At 604, the security catalog (i.e., security catalog 312) may be accessed, and the parent application object definitions of application object 407 may be obtained. Then, at 605, the parent application objects may be obtained (i.e., application objects 302, 303, 304, 308, and 309). At 606, the ACL may be checked to determine whether a particular parent application object may be included in the ACL. As previously described above, the order in which the parent application objects may be checked may be based on a predetermined order. The same mechanism used above may be used to perform the check. Similarly, if the check indicates that such entry exists in the ACL, the method goes to 607 where the permission associated with the parent object is determined. For example, it may be determined whether permission to delete object instances 307 of application object definition 407 is associated with the parent object in the ACL. That is, it may be determined whether the ACL includes an entry in the permission field specifying permission to delete the object definition and a corresponding entry in the object field specifying an instance of the parent object, which indicates that User 1 may have permission to delete the object instances of application object definition 407 based on a parent object definition. If so, User 1 may be granted permission to delete application object 307 if application object 307 includes information indicating that the particular parent application object is associated with application object 307 (e.g., if application object 307 has an attribute specifying a parent object type that matches the parent object type in the objects field). If, after all the parent application objects have been checked, it is determined that User 1 may not be granted permission to delete application object 307, the method proceeds back to step 604 where the hierarchy may be traversed another level up, and the ancestor application objects may be determined and processed as described above. The method may end when the hierarchy may not be traversed any higher or when User 1 is granted permission to delete application object 307, for example.

Figure 7:
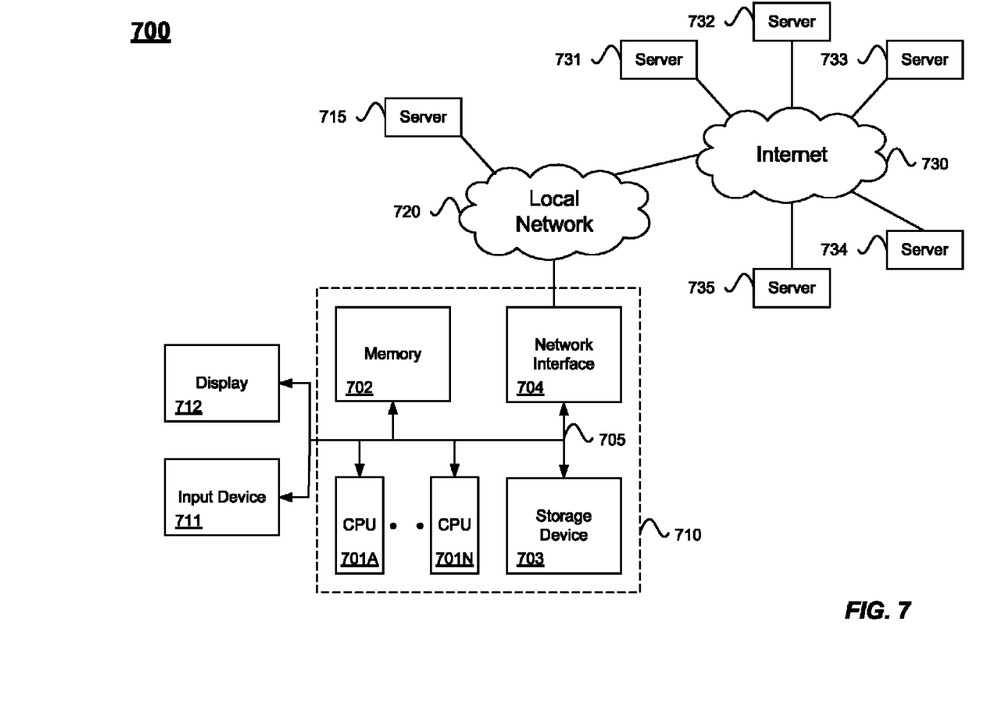
FIG. 7 illustrates a hardware system for implementing processes according to one embodiment of the present invention.

FIG. 7 illustrates a simplified diagram of a hardware system for implementing processes according to one embodiment of the present invention. Computer system 710 includes one or more buses 705 or other communication mechanism for communicating information, and one or more central processing units ("CPUs" or "processors") 701A-N coupled with bus 705 for processing information. It is to be understood that actual implementations may vary and include additional multi-CPU components for managing multiple CPUs. Computer system 710 also includes one or more memories 702 coupled to bus 705 for storing information and instructions to be executed by processors 701, including information and instructions for performing the techniques described above, for example. This memory may also be used for storing variables or other intermediate information during execution of instructions to be executed by processors 701. Possible implementations of this memory may be, but are not limited to, random access memory (RAM), read only memory (ROM), or both. A storage device 703 is also provided for storing information and instructions. Common forms of storage devices include, for example, a hard drive, a magnetic disk, an optical disk, a CD-ROM, a DVD, a flash memory, a USB memory card, or any other medium from which a computer can read. Storage device 703 may include source code, binary code, or software files for performing the techniques or embodying the constructs above, for example.

Computer system 710 may be coupled via bus 705 to an output device such as display 712, such as a cathode ray tube (CRT) or liquid crystal display (LCD), for displaying information to a computer user. An input device 711 such as a keyboard and/or mouse is coupled to bus 705 for communicating information and command selections from the user to processor 701. The combination of these components allows the user to communicate with the system. In some systems, bus 705 may be divided into multiple specialized buses.

Computer system 710 also includes a network interface 704 coupled with bus 705. Network interface 704 may provide two-way data communication between computer system 710 and the local network 720. The network interface 704 may be a digital subscriber line (DSL) or a modem to provide data communication connection over a telephone line, for example. Another example of the network interface is a local area network (LAN) card to provide a data communication connection to a compatible LAN. Wireless links using radio frequency communications are another example. In any such implementation, network interface 704 sends and receives electrical, electromagnetic, or optical signals that carry digital data streams representing various types of information.

Computer system 710 can send and receive information, including messages or other interface actions, through the network interface 704 to an Intranet or the Internet 730. In the Internet example, software components or services may reside on multiple different computer systems 710 or servers 731-735 across the network. The processes described above may be implemented on one or more servers, for example. A server 731 may transmit actions or messages from one component, through Internet 730, local network 720, and network interface 704 to a component on computer system 710. Different processes may be implemented on any computer system and send and/or receive information across a network, for example. In one embodiment, the techniques describe above may be implemented by software services on one or more servers 731-735, for example.

The above description illustrates various embodiments of the present invention along with examples of how aspects of the present invention may be implemented. The above examples and embodiments should not be deemed to be the only embodiments, and are presented to illustrate the flexibility and advantages of the present invention as defined by the following claims. Based on the above disclosure and the following claims, other arrangements, embodiments, implementations and equivalents will be evident to those skilled in the art and may be employed without departing from the spirit and scope of the invention as defined by the claims.

What is claimed is:

1. A computer-implemented method comprising:
receiving, by a computer system, a request from a user to perform an action on a first object in a plurality of objects in a software application;
accessing, by the computer system, a predefined hierarchy of a plurality of different object definitions, wherein said first object is an instance of a first object definition in the predefined hierarchy;
determining, by the computer system, an attribute of the first object comprising a second object, wherein the second object is a particular instance of a second object definition, wherein said second object definition is an ancestor of said first object definition in the predefined hierarchy, and wherein the attribute defines an association between the first object and the second object that is independent of the predefined hierarchy;
accessing, by the computer system, user authorization data;
determining, by the computer system, permission of the user to perform said action; and
granting, by the computer system, the user permission to perform the action on said first object,
wherein the permission is determined from the predefined hierarchy of the plurality of different object definitions, the attribute, and the user authorization data, and
wherein the user is granted permission to perform the action on said first object if the user authorization data grants the user permission to perform the action on the first object based on the first object definition and the attribute.

2. The method of claim 1 wherein said first object includes information specifying said second object.

3. The method of claim 1 wherein determining the permission from the predefined hierarchy and the user authorization data includes:
determining the ancestor object definitions of said first object definition at a particular level in the predefined hierarchy;
for each ancestor object definition, checking the permission to perform the action based on an instance of the ancestor object definition, wherein the order of checking the ancestor object definitions is based on a predetermined order; and
traversing to the next level if the user has not been granted permission to perform the action on said first object, and not traversing to the next level if the user has been granted permission to perform the action on said first object.

4. The method of claim 3 wherein the maximum number of levels that can be traversed is based on a predetermined value.

5. The method of claim 1 wherein the predefined hierarchy of the plurality of object definitions is stored in a database.

6. The method of claim 1 wherein the user authorization data comprises a list of permissions, and wherein an entry in the list of permissions specifies at least one user, a permissible action that may be performed on a specified object definition, and an object instance of an ancestor object definition.

7. The method of claim 1 wherein an object in the software application includes information specifying one or more different objects in the software application, wherein each of the one or more different objects in the software application is an instance of an ancestor object definition in the predefined hierarchy.

8. The method of claim 1 wherein the plurality of object definitions in the predefined object definition hierarchy is configured as a directed graph.

9. The method of claim 8 wherein the directed graph is configured in a multi-parent unbalanced non-binary tree form.

10. A non-transitory computer-readable medium containing instructions for controlling a computer system to perform a method, the method comprising:
receiving a request from a user to perform an action on a first object in a plurality of objects in a software application;
accessing a predefined hierarchy of a plurality of different object definitions, wherein said first object is an instance of a first object definition in the predefined hierarchy;
determining an attribute of the first object comprising a second object, wherein the second object is a particular instance of a second object definition, wherein said second object definition is an ancestor of said first object definition in the predefined hierarchy, and wherein the attribute defines an association between the first object and the second object that is independent of the predefined hierarchy;
accessing user authorization data; and
determining permission of the user to perform said action; and
granting the user permission to perform the action on said first object,
wherein the permission is determined from the predefined hierarchy of the plurality of different object definitions, the attribute, and the user authorization data, and
wherein the user is granted permission to perform the action on said first object if the user authorization data grants the user permission to perform the action on the first object based on the first object definition and the attribute.

11. The non-transitory computer-readable medium of claim 10 wherein said first object is associated with said second object if said first object includes information specifying said second object.

12. The non-transitory computer-readable medium of claim 10 wherein determining the permission from the predefined hierarchy and the user authorization data includes:

determining the ancestor object definitions of said first object definition at a particular level in the predefined hierarchy;

for each ancestor object definition, checking the permission to perform the action based on an instance of the ancestor object definition, wherein the order of checking the ancestor object definitions is based on a predetermined order; and traversing to the next level if the user has not been granted permission to perform the action on said first object, and not traversing to the next level if the user has been granted permission to perform the action on said first object.

13. The non-transitory computer-readable medium of claim 12 wherein the maximum number of levels that can be traversed is based on a predetermined value.

14. The non-transitory computer-readable medium of claim 10 wherein the predefined hierarchy of the plurality of object definitions is stored in a database.

15. The non-transitory computer-readable medium of claim 10 wherein the user authorization data comprises a list of permissions, and wherein an entry in the list of permissions specifies at least one user, a permissible action that may be performed on a specified object definition, and an object instance of an ancestor object definition.

16. The non-transitory computer-readable medium of claim 10 wherein an object in the software application includes information specifying one or more different objects in the software application, wherein each of the one or more different objects in the software application is an instance of an ancestor object definition in the predefined hierarchy.

17. The non-transitory computer-readable medium of claim 10 wherein the plurality of object definitions in the predefined object definition hierarchy is configured as a directed graph.

18. The non-transitory computer-readable medium of claim 17 wherein the directed graph is configured in a multi-parent unbalanced non-binary tree form.

* * * * *